Oct. 16, 1934.  M. FEYBUSCH  1,977,475
MEANS FOR READING
Filed April 26, 1933  6 Sheets-Sheet 1

Fig.1.

INVENTOR
MARTIN FEYBUSCH
BY
ATTORNEY

Oct. 16, 1934.　　　　M. FEYBUSCH　　　　1,977,475
MEANS FOR READING
Filed April 26, 1933　　6 Sheets-Sheet 2

INVENTOR
MARTIN FEYBUSCH
BY
ATTORNEYS

Oct. 16, 1934.    M. FEYBUSCH    1,977,475
MEANS FOR READING
Filed April 26, 1933    6 Sheets-Sheet 3

INVENTOR
MARTIN FEYBUSCH
BY
ATTORNEYS

Oct. 16, 1934.  M. FEYBUSCH  1,977,475
MEANS FOR READING
Filed April 26, 1933  6 Sheets-Sheet 4

INVENTOR
MARTIN FEYBUSCH
BY
ATTORNEYS

Oct. 16, 1934.  M. FEYBUSCH  1,977,475
MEANS FOR READING
Filed April 26, 1933  6 Sheets-Sheet 5

INVENTOR
MARTIN FEYBUSCH
BY
ATTORNEYS

Oct. 16, 1934.                M. FEYBUSCH                1,977,475
                           MEANS FOR READING
                      Filed April 26, 1933    6 Sheets-Sheet 6

INVENTOR
MARTIN FEYBUSCH
BY
ATTORNEYS

Patented Oct. 16, 1934

1,977,475

UNITED STATES PATENT OFFICE 1,977,475

MEANS FOR READING

Martin Feybusch, New York, N. Y.

Application April 26, 1933, Serial No. 667,967

9 Claims. (Cl. 88—24)

My invention relates to the art of reading and more particularly to reading matter which has a related continuity from its beginning to its end as exemplified for instance by a narrative or a musical composition, in contradistinction to mere statements such as for example, an advertisement or a reference to an event or subject matter briefly independent in itself. Heretofore reading matter of the type in question has been produced in the form of books, magazines, newspapers, sheet music and the like which require the reader to adapt himself or herself to the reading matter, and which, during prolonged periods of reading, develop fatigue and require periodic changes in optical and bodily adjustments which interfere with proper concentration during the perusal of the subject matter; in other words, in the case of books, magazines and the like, the particular publication must be held by the reader and must be manipulated by turning of the pages and otherwise in order to permit the reading to proceed, while in the case of music, whether in book or sheet form, in most instances, requires the pages to be successively turned until the particular composition has been fully rendered. Under such conditions, physical energy is required to be expended which in the case of invalids and weakened persons, in many instances precludes the possibility of reading at all; in the case of musicians, particularly instrumentalists, the necessity for turning a page arises at a point in the composition which interferes with the proper rendition thereof and ofttimes spoils such rendition. In addition to the above, the production of the books, magazines, newspapers and musical publications is expensive and time consuming.

The object of my invention is to overcome the above and other existing objections by providing a novel method and apparatus for reading subject matter which requires prolonged periods of concentration in its perusal, and which serve to eliminate physical limitations incidental to existing methods of reading and present reading equipment. A further object of the invention is to provide a novel method and apparatus which deals particularly with the relationship of text or reading matter and the optical effect upon the human body in establishing concentration and permitting the full effect of mental reflexes to be derived from the reading matter. Another object of the invention is to produce the subject matter by phototechnical processes directly from the author's typewritten manuscript or, in the case of music, directly from the author's original, upon a film, which may be rolled into a reel of comparatively small compass, and thus is capable of being easily carried on the person or otherwise transported from place to place. The invention contemplates further the provision of a novel and efficient reading apparatus whereby the narrative, musical composition or the like may be efficiently projected on a screen within normal reading distance from the reader as exemplified by the customary distance in reading a conventional publication of existing type, and under the complete manual control of the reader with a minimum of effort and without fatigue or inconvenience. Other objects will appear from the description hereinafter and the features of novelty will be pointed out in the claims.

In the accompanying drawings, which illustrate examples of the invention without defining its limits.

Figure 1:
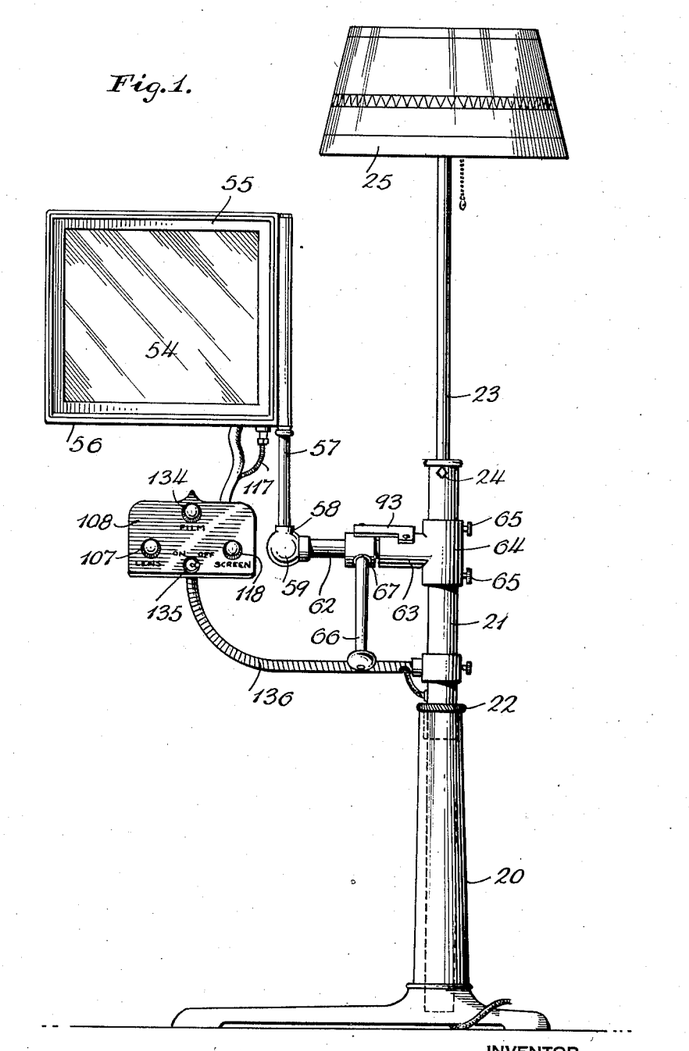
Fig. 1 is a front elevation of the novel reading apparatus.
Figures 13, 14, 15:
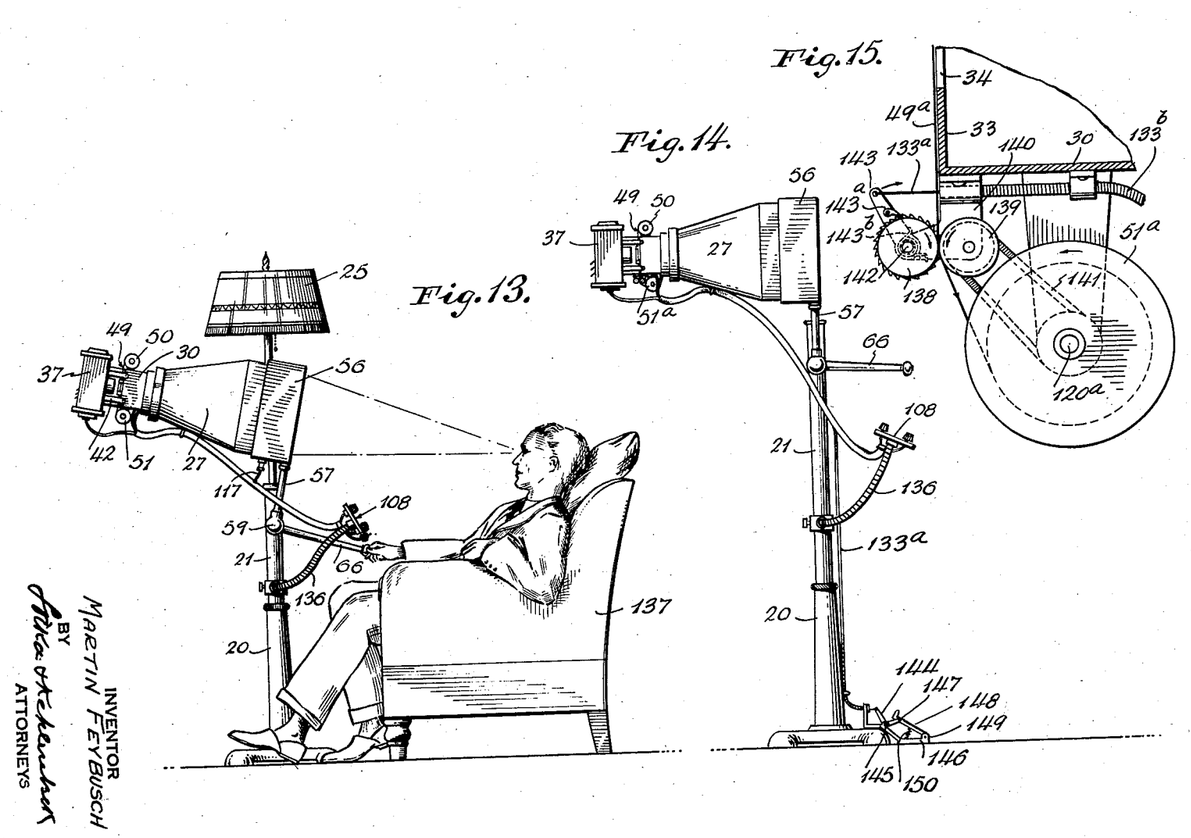
Fig. 13 is a view showing the reading apparatus in use.
Fig. 14 is an elevation of another form of the apparatus.
Fig. 15 is a fragmentary detail view of a portion of this last named form of the apparatus.

For the purpose of illustration and description, and not with any intent to define the limits of the invention, the reading apparatus of Figs. 1 to 13 inclusive has been shown in combination with an electric floor lamp, comprising an upright pedestal 20 in which a tubular sleeve 21 is mounted, preferably so as to be vertically adjustable relatively thereto; the sleeve 21 may be fixed in its adjusted position in any convenient manner, as by means of a locking collar 22 suitably mounted on said pedestal 20, as indicated in Figs. 1 and 13. A tubular member 23 is supported in the sleeve 21, preferably so as to be adjustable therein, and is secured in an adjusted position in any customary manner as by means of a conventional set screw 24; any usual type of light fixture and lamp shade 25 is mounted at the upper end of the member 23, suitable provision being made for supplying electric current to the bulb or bulbs forming part of the lamp fixture, and for controlling said current. As so far described the elements, per se, constitute no part of the invention and simply exemplify one type of support which may be conveniently utilized for carrying the novel reading apparatus.

Figure 2:
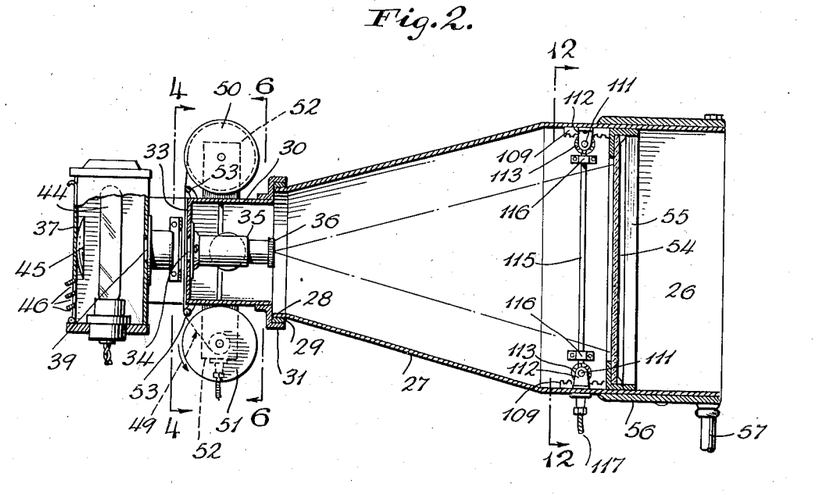
Fig. 2 is a detail longitudinal section of the projecting unit of said apparatus on an enlarged scale.
Figure 3:
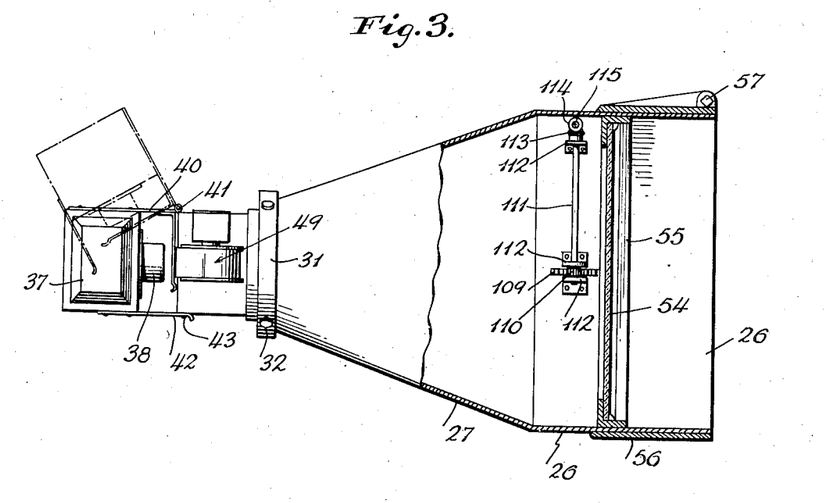
Fig. 3 is a plan view of said unit, partly in section.
Figures 4, 5:
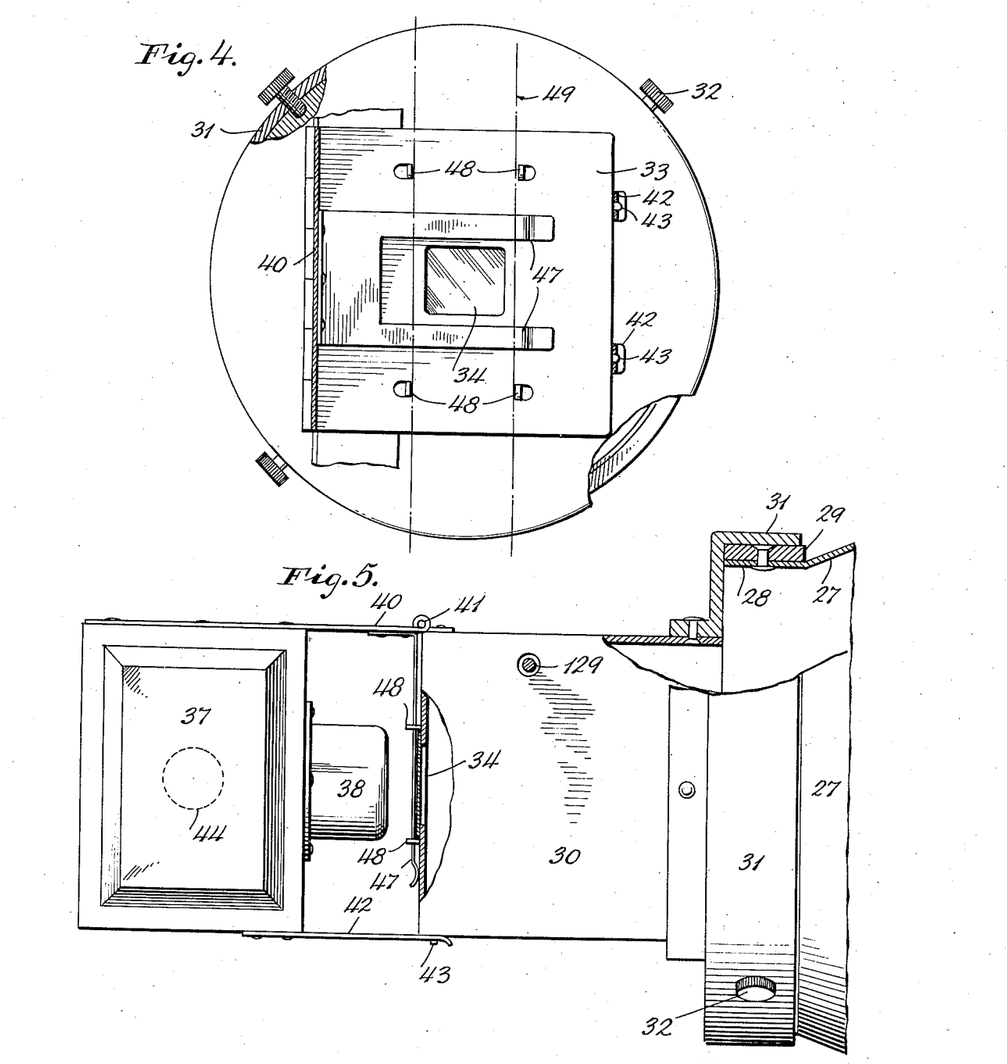
Fig. 4 is an enlarged, detail cross-section on the line 4—4 of Fig. 2.
Fig. 5 is a fragmentary plan view of the projection unit on an enlarged scale, with parts broken away.

In its illustrated form the latter comprises a light-proof projecting chamber consisting of a front end section 26, preferably of rectangular form, and a continuing section 27 which tapers in a direction away from the section 26 and terminates in an annular flange 28 on which a bearing ring 29 is externally secured in any convenient manner. The objective chamber 30 is provided at its one end with an annular bearing member 31 whereby said objective chamber 30 is rotatably mounted on the bearing ring 29; any suitable means may be provided for preventing unintentional rotation of the bearing member 31 on the bearing ring 29 as by providing the latter with a plurality of spaced internally threaded recesses for the threaded reception of set screws 32 carried by the bearing member 31 as illustrated in Fig. 4. The objective chamber 30 thus constitutes a continuation of and communicates with the interior of the section 27 of the projecting chamber, and at its rear end is provided with a wall 33 in which the customary window 34 is formed. Any conventional type of objective suitable for the purpose may be mounted in the objective chamber 30, and as shown in the drawings, comprises a bearing tube 35 fixed upon and projecting in perpendicular relation to the wall 33 in registry with the window 34 thereof; the objective further consists of a tubular lens carrier 36 containing the customary lens and slidably or telescopically mounted in the bearing tube 35 so as to be adjustable in the direction of its axis by mechanism which will be more fully described hereinafter. In addition to the parts so far described, the reading apparatus includes a light chamber 37 located at a distance from the objective chamber 30, and carrying a condenser 38 of any customary type located in axial registry with and in spaced relation to the window 34, and the lens carrier 36; the condenser 38 is mounted on the light chamber 37 in registry with an opening 39 provided in the front wall thereof. In its preferred form, the light chamber is carried by a supporting member 40, pivotally connected at 41 with the objective chamber 30 so that said light chamber 37 is capable of being adjusted to an inoperative position, as indicated by dotted lines in Fig. 3. Suitable provision is made for locking the lighting chamber 37 in its operative position; for this purpose the lighting chamber 37 in the illustrated example is provided with resilient latching members 42 having apertures adapted to engage pins or projections 43 located exteriorly on the objective chamber 30 as shown in Fig. 3, 5 and 13. A suitable light producing means is mounted in the light chamber 37, which means, in the form shown in the drawings, comprises an electric incandescent lamp 44, connected with a suitable source of electricity and located in front of a reflector 45 mounted interiorly of the light chamber 37 upon the rear wall thereof. For the purpose of ventilating the interior of the light chamber 37 to prevent overheating, said chamber is preferably provided with air inlets 46. As shown in Figs. 2, 3, 4 and 5, the reading apparatus is provided with resilient fingers 47 fixed upon the supporting member 40 and extending transversely across the film path at points above and below the window 34, as illustrated in Fig. 4; guide lugs 48 are located in pairs above and below the fingers 47 as shown in Fig. 4, said guide lugs 48 projecting perpendicularly from the rear wall 33 of the objective chamber and, if desired, comprising portions of this wall which are stamped and bent outwardly therefrom.

In the reading apparatus being described, the reading matter as exemplified for instance by a complete narrative or story, is produced in minute or reduced size upon a transparent film 49 of conventional width and of any desired length adapted to contain the complete text of the narrative or its equivalent. This film 49 is carried upon a reel 50 and after passing across the window 34 is wound upon a reel 51 or vice versa in the manner to be more fully set forth hereinafter; in its passage across the window 34, the film 49 travels between the lugs 48 and between the guide fingers 47 and the wall 33 of the objective chamber 30, said lugs 48 serving to maintain the film 49 in its path of travel and said fingers 47 preventing the film from being bulged or shifted away from the window 34. The reels 50 and 51 are mounted upon suitable shafts journalled in bearings 52 which project in opposite directions from the objective chamber 30, the arrangement being preferably such that the reels 50 and 51 are easily mounted on and removed from their respective shafts as may be required. To facilitate the travel of the film from the reel 50 to the reel 51, idler rolls 53 are mounted upon the objective chamber 30 as shown in Fig. 2. The forward section 26 of the projection chamber is provided interiorly with a screen 54 of suitable material such as translucent glass, said screen 54 being mounted in a frame 55 slidably fitted within the section 26 so as to be adjustable longitudinally thereof as will be more fully set forth further on in the description.

Figures 10, 11, 12:
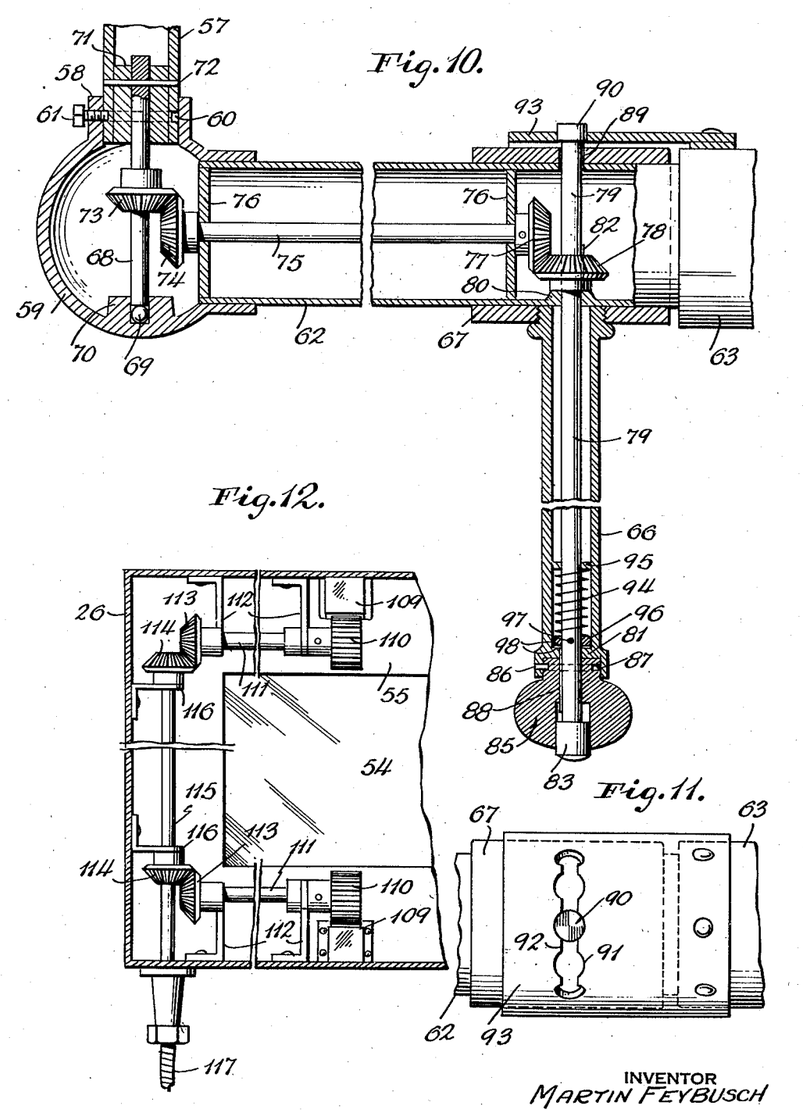
Fig. 10 is an enlarged, fragmentary sectional view of the control means.
Fig. 11 is a fragmentary plan view of a portion of said control means.
Fig. 12 is a fragmentary, enlarged section on the line 12—12 of Fig. 2.

The projection chamber and its associated elements are mounted upon its support, which, in the illustrated example, is exemplified by the floor lamp, so as to be adjustable in various ways under the complete manual control of the reader. For this purpose the forward section 26 of the projection chamber is fixed in a frame 56 which is clamped or otherwise secured upon a preferably tubular member 57 mounted for rotation about its axis in a bushing 58 forming part of a hollow spherical fixture 59; to maintain the tubular member 57 against axial movement relatively to the bushing 58 without interfering with the rotation of said member 57, the latter may be provided with an annular groove 60 for the accommodation of one or more set screws 61 which are adjustably threaded in said bushing 58, as shown in Fig. 10. The spherical fixture 59 is secured in any convenient manner upon one end of a tubular rod 62, the other end of which is rotatably mounted in a bearing 63 forming part of and projecting from a collar 64 mounted on the sleeve 21 preferably so as to be adjustable lengthwise thereof; the collar 64 may be fixed in an adjusted position on the sleeve 21 in any suitable manner as by means of set screws 65 and suitable provision is made to prevent lengthwise movement of the tubular rod 62 relatively to the bearing 63 without interference with the rotation of said rod 62 therein. To rock the rod 62 about its axis in the bearing 63 and to thereby tilt the projection chamber in a manner to adjust the screen 54 to different angular positions, an operating handle 66 is provided which extends radially outward from a collar 67 fixed upon the rod 62 in any convenient manner. The apparatus further includes means for manually rotating the tubular member 57 about its axis to thereby swing the projection chamber in a manner to adjust the screen 54 about the axis of said tubular member 57. In the illustrated example, this mechanism comprises a shaft 68 one end of which bears against an anti-friction thrust bearing 69 located in the recess of a bearing 70 formed interiorly of the spherical member 59, said shaft 68 having its other end connected with the tubular member 57 by means of a plug 71 fitted within the end of said tubular member 57; as shown in Fig. 10, a pin 72 or its equivalent extends diametrically through the bearing member 57, plug 71 and shaft 68 to rigidly connect the latter with said tubular member 57. The shaft 69 carries a bevel pinion 73 which meshes with a bevel pinion 74 mounted on a countershaft 75 journalled in bearing partitions 76, fitted within the tubular rod 62 at the proper points, as illustrated in Fig. 10. The countershaft 75 carries a second bevel pinion 77 which meshes with a bevel pinion 78 mounted for rotation within the tubular rod 62 in registry with the handle 66 but fixed against movement in an axial direction in any suitable manner. The handle 66 is hollow and is interiorly provided with an operating rod 79 which is rotatably mounted in bearings 80 and 81 and is connected with the pinion 78 by means of a key 82 whereby the pinion 78 is adapted to be rotated through the medium of the rod 79 and the latter is capable of sliding in the direction of its axis relatively to said pinion 78 without becoming disconnected therefrom for the purpose to be more fully set forth hereinafter. At its one end the rod 79 carries a button or the like 83 slidably mounted in a recess 84 of an operating knob or head 85 which is rotatable in the outer end of the handle 66 and is held in place by means of a radial pin 86 which projects into an annular groove with which the knob 85 is provided, as shown in Fig. 10; the connection between the rod 79 and the knob 85 is effected by means of one or more keys 88 whereby said rod 79 is adapted to be rotated about its axis by the knob 85 and at the same time is capable of shifting relatively thereto in the direction of its axis. At its opposite end the rod 79 projects outwardly beyond the collar 67 through registering openings 89 provided in said sleeve and the tubular rod 62 and terminates in a head 90 which is normally seated in one of a series of locking apertures 91 connected with each other by slots 92 and formed in a curved locking member 93 which is fastened exteriorly upon the bearing 63 and projects over the sleeve 67, as shown in Figs. 1 and 10. With the parts in the position illustrated in Fig. 10 in which the head 90 is located in one of the locking apertures 91, the tubular rod 62 is locked against rotation about its axis and the projection chamber with its associated elements is accordingly fixed in position to secure the screen 54 at an angle most comfortable and convenient to the reader; the operation of this part of the apparatus will be described in greater detail further on in the description. In order to automatically restore the parts to the normal position illustrated in Fig. 10, a spring 94 is provided which bears with its one end against an abutment fixed within the handle 66 and with its other end engages a washer 96 fastened upon the rod 79 in any convenient manner as by means of a diametric pin 97. The washer 96 may also serve to prevent unintentional rotation of the rod 79 about its axis and for this purpose may have its one surface provided with teeth or serrations for co-operation with corresponding teeth or serrations formed on the contiguous surface of the bearing 81, as indicated at 98 in Fig. 10.

In order to enable the lens in the lens carrier 36 of the objective to be properly focused, said carrier 36 is provided with a pin 99 which extends radially outward through a recess 100 formed in the tubular bearing 35 and projects into an eccentric cam groove 101 formed in a focusing disk 102. The focusing disk 102 is suitably secured upon a shaft 103 which is journalled in a bearing 104 mounted interiorly of the objective chamber 30 and cooperating bearing 105 mounted exteriorly of said chamber in registry with the bearing 104. The shaft 103 is connected by means of a flexible shaft 106 with an operating button 107 journalled upon a bracket plate 108 fixed in place in the apparatus in any conventional manner, and preferably as hereinafter set forth.

As previously stated, the screen 54 is preferably adjustable within the section 26 of the projection chamber, at the will of the reader, in order to facilitate the focusing of the apparatus and to enable a projection of maximum efficiency to be obtained upon said screen 54. In the illustrated example the mechanism whereby this adjustment of the screen 54 is accomplished, comprises racks 109 forming part of or connected with the frame 55 and slidably mounted interiorly of said section 26, as shown in Figs. 2 and 3. The racks 109 individually mesh with pinions 110 carried by shafts 111 journalled in bearings 112 located at the proper points within said section 26. The shafts 111 are provided with bevel pinions 113 which mesh with bevel pinions 114 secured upon a countershaft 115 which is rotatably mounted in bearings 116 suitably fixed in place in the interior of the section 26 of the projection chamber. The shaft 115 projects exteriorly of the section 26 and is connected by means of a flexible shaft 117 with an operating button 118 also journalled on the bracket plate 108, as shown in Fig. 1.

Figures 6, 7, 8, 9:
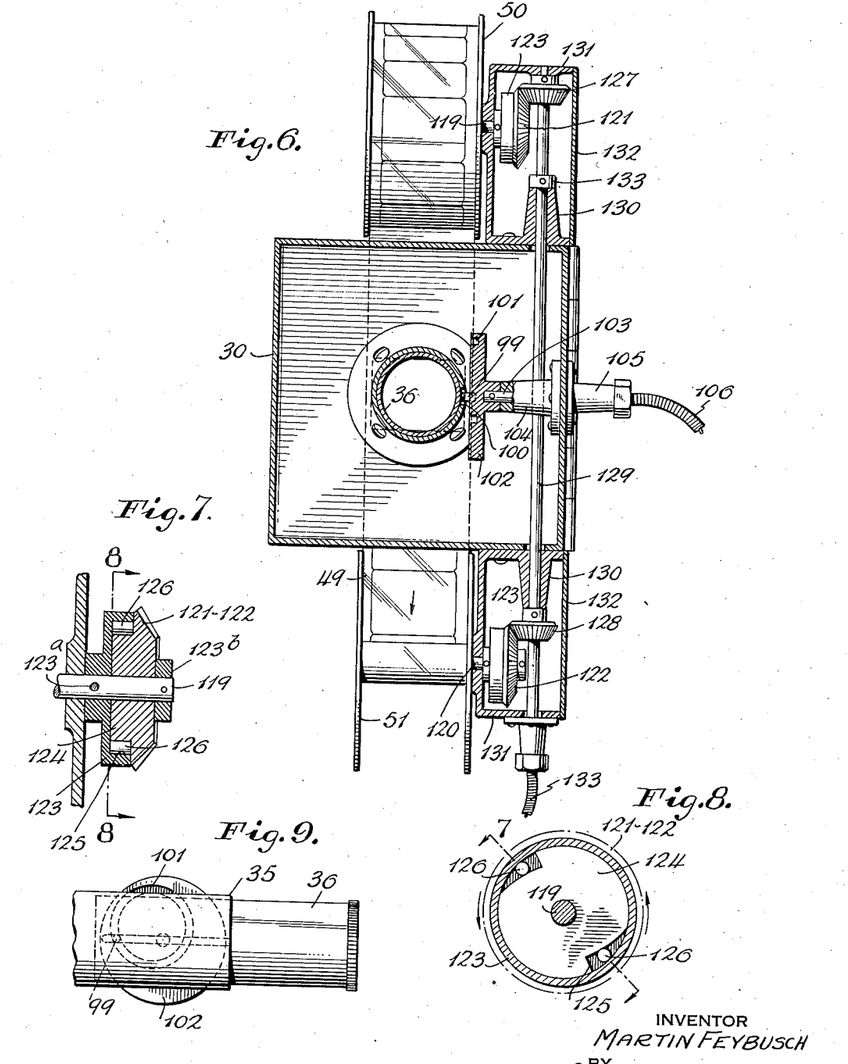
Fig. 6 is an enlarged cross-section on the line 6—6 of Fig. 2.
Fig. 7 is a detail section of a portion of the setting mechanism, on the line 7—7 of Fig. 8.
Fig. 8 is a detail section on the line 8—8 of Fig. 7.
Fig. 9 is a detail view of the focusing means.

For the purpose of shifting the film 49 in successive steps at periodic intervals, in order to bring successive portions of the reading matter on said film 49 to the screen 54 as the reading proceeds, the reels 50 and 51 may, as previously mentioned, be removably carried on shafts, which are indicated as 119 and 120 respectively, which shafts have mounted thereon the respective bevel pinions 121 and 122. The connection between the shaft 119 and pinion 121 and the shaft 120 and pinion 122 is effected by means of suitable clutches which in one direction of movement rigidly connect the pinions with the co-operating shafts and in the opposite direction of rotation permit a freedom of movement between the shaft and its co-operating pinion; an example of such a clutch is shown in Figs. 7 and 8 and comprises a clutch member 124 forming part of each pinion 121 and 122 and loosely mounted upon the shaft 119 or 120 and provided with eccentric recesses 125 for the accommodation of rollers whereby said clutch member 124 is coupled with an annular flange of the clutch member 123 or disconnected therefrom in dependence upon the direction of rotation of the pinions 121 and 122; the clutch members 123 are fastened upon the respective shafts 119 and 120 in any suitable manner, as by set screws 123a, and washers 123b are fixed upon said shafts to maintain the pinions 121 and 122 in place thereon. With this arrangement, the shafts 119 and 120 selectively become the operating shafts to operatively rotate either the reel 50 or the reel 51 to wind the film 49 thereon in dependence upon the direction of travel of said film; in other words, as the one reel is positively actuated to wind the film 49 thereon, the other reel is permitted to idle to permit unwinding of the film 49 therefrom and vice versa. The pinions 121 and 122 are in mesh respectively with bevel pinions 127 and 128 both of which are fixed upon a shaft 129 which is rotatably mounted in bearings 130 preferably located within casings 131, the interior of which may be rendered accessible through the medium of removable covers 132, said casings 131 and covers 132 serving to completely enclose the bevel pinions and their associated elements, as illustrated in Fig. 6. To fix the shaft 129 against lengthwise movement, a collar 133 may be secured thereon in engagement with one of the bearings 132, as also shown in said Fig. 6. The shaft 129 projects exteriorly of one of the casings 131 and is connected by means of a flexible shaft 133 with an operating button 134 also journalled on the bracket plate 108. The latter may further be provided with a conventional switch 135 connected through the medium of a cable 136 with a suitable source of electricity, whereby the electric current for operating the incandescent light 44 or its equivalent, may be controlled. The cable 136 in addition to its other functions may serve as the previously mentioned support for the bracket plate 108, and in such case will be sufficiently rigid to provide such support and yet be flexible enough to enable said plate 108 to be adjusted to various positions.

In practice the projection chamber and its associated elements are adjusted, by shifting the collar 64 lengthwise of the sleeve 21, to bring the screen 54 to a position or level most suitable and convenient to the position occupied by the reader; the screws 65 are then manipulated to fasten the collar 64 in its adjusted position on the sleeve 21 whereby the projection chamber, and in particular the screen 54, are correspondingly fixed in place. Assuming that the reader desires to occupy a sitting position in an easy chair as illustrated in Fig. 13, the chair 137 is placed in a position relatively to the reading apparatus in which the reader in a comfortable sitting position is located within normal reading distance of said apparatus or, in other words, the screen 54 is positioned at a distance from the reader corresponding approximately to the distance at which a conventional publication is easily readable by the reader. This arrangement brings the handle 66 within easy reach of the reader who may accordingly utilize said handle 66 to rotate the tubular rod 62 about its axis to thereby adjust the screen 54 to either upright or inclined position which brings it into the line of vision of the reader in a manner conductive to the greatest comfort and without requiring any material shifting of the head to view all parts of said screen 54 and in order to avoid the development of any eye strain as the reading proceeds. In order to permit the aforesaid rotation of the tubular rod 62 about its axis, it is first necessary to exert a pressure upon the button 83, which may be easily done by the thumb of the reader, to thereby shift the operating rod 79 in the direction of its length, whereby the head 90 is moved out of the locking aperture 91 previously occupied thereby; in this condition the head 90 develops no resistance to the rotation of the tubular rod 62 which may accordingly be rotated as described, during which operation the operating rod 79 moves through one or more connecting slots 92 until the head 90 registers with the locking aperture 91 corresponding most nearly to the position to which it is desired to adjust the parts. At this stage the pressure is removed from the button 83 whereupon the spring 94, by acting on the washer 96, shifts the operating rod 79 in a return direction and adjusts the head 90 into the locking aperture 91 with which said head is in registry, whereby the tubular rod 62 and the parts carried thereby are again locked in position; during these lengthwise movements of the operating rod 79, the connection between the latter and the pinion 78 and knob 85 is maintained by means of the keys 82 and 88 respectively.

If with these operations of the parts, the screen 54 still does not occupy the most advantageous reading position relatively to the reader, or in other words is not squarely in the line of vision of said reader, further adjustment of said screen may be effected by rotating the knob 85 relatively to the handle 66 which may be easily accomplished without requiring any material shifting in the position of the reader. This rotation of the knob 85 correspondingly rotates the operating rod 79, which rotation is transmitted through the medium of the pinions 78 and 77 to the countershaft 75 which in turn, by means of the pinions 74 and 73, rotates the shaft 68 and with it the tubular member 57. This causes the frame 56 and with it the projection chamber and the elements carried thereby to be shifted about the axis of the tubular member 57 whereby the screen 54 is correspondingly adjusted about said axis until the desired position thereof, most suitable to the reader, has been reached. To permit this adjustment to be made it is necessary to exert a slight pressure upon the button 83 to move the operating rod 79 axially to an extent sufficient to disconnect the serrations or teeth of the washer 96 from the co-operating teeth or serrations of the bearing 81, it being understood that this lengthwise movement of the operating rod 79 need not be sufficient to disconnect the head 90 from the locking aperture 91 in which it is seated; when the desired adjustment of the screen 54 has been effected, the buttom 83 is released to permit the spring 94 to again move the operating rod 79 in a reverse direction to thereby restore the connection between the serrations of the washer 96 and those of the bearing 91 and thus lock the parts against unintentional movement. It will of course be understood that the reel 50 with the film 49 thereon has previously been mounted upon its shaft 119 and that the film 49 has been threaded through the apparatus and its end connected to the reel 51, said film 49 being guided between the guide lugs 48 and between the guide fingers 47 and the rear wall 33 of the objective chamber 30 in registry with the window 34 thereof.

At this stage the reader may rotatably actuate the operating button 134 on the bracket plate 108 which operation correspondingly rotates the flexible shaft 133 and the shaft 129 to thereby correspondingly operate the pinions 127 and 128, the rotative motion of which is transmitted to the bevel pinions 121 and 122. The direction of rotation is such that, by reason of the clutch connections between the pinions 121 and 122, and the shafts 119 and 120 respectively, the shaft 120 will be rotatably driven while the shaft 119 and pinion 121 will at the same time be capable of freely rotating relatively to each other; it will be understood that the clutch connections between the pinions 121 and 122 and their respective shafts is arranged to effect the indicated results. As the operating button 134 is operated the reel 51 is thereby positively rotated to wind the film 49 thereon while the reel 50 at the same time is capable of free rotation to permit a corresponding unwinding of said film 49 therefrom. This manipulation of the parts is continued until the beginning of the reading matter on the film 49 is visible on the screen 54, it being understood that the switch 135 has previously been operated to close the electric current whereby the incandescent lamp 44 is electrically energized.

The objective in the objective chamber 30 may be adjusted to properly focus the lens which is contained in the tubular lens carrier 36 by rotating the operating button 107 on the bracket plate 108 in one direction or the other. This operation of the button 107 correspondingly rotates the flexible shaft 106, the shaft 103 and the focusing disk 102; the described operation of this disk 102, through the medium of the cam groove 101 and pin 99, causes the lens carrier 36 to be slidably shifted in the tubular bearing 35 in an axial direction until the lens has been brought into proper focus with the screen 54. If for any reason it should become necessary to do so, the screen 54 itself may be adjusted in the section 26 by rotating the operating button 118 on the bracket plate 108 in one direction or the other, to thereby correspondingly rotate the flexible shaft 117 and shaft 115; the rotation of the latter is transmitted by means of the bevel pinions 114 and 113 to the shafts 111 and accordingly brings about a corresponding rotation of the pinions 110. The latter by acting upon the racks 109 cause the frame 55 to be slidably shifted in the section 26 of the projection chamber and correspondingly adjust the screen 54 in said section.

Because of the fact that the controlling elements necessary to effect the adjusting operations of the parts as hereinbefore described are all located in close proximity to each other within easy reach of the reader and without requiring the latter to materially change his position, the adjustments may be made with a minimum of effort and with absolutely no discomfort to the reader; it is accordingly possible to adjust all parts of the apparatus to positions in which the reading may proceed without any physical effort on the part of the reader tending to develop fatigue and with all parts of the anatomy of the reader free to assume any position desired or to perform any extraneous labor such as, for instance, writing while the reading proceeds.

When the reading of the matter projected or exposed on the screen 54 has been finished, or at any other time desired by the reader, a new section of the film 49 may be shifted into position for projecting successive reading matter upon said screen 54 by simply manipulating the operating button 134 in the manner previously set forth. Similarly, the adjustments of the apparatus as described hereinbefore may be selectively varied at any time, at the will of the reader as the reading proceeds, by operating the various control means in the manner described. Because of the fact that the bracket plate 108 is supported for instance by the flexible cable 136, this bracket plate 108 is capable of itself being shifted to bring it to a position most comfortable to the reader, regardless of the position occupied by said reader at the time the reading takes place.

In the illustrated example of the apparatus and so far in the description of the operation thereof, it has been assumed that the objective chamber 30 and the reels 50 and 51 occupy the positions shown in Fig. 2, in which case the film 49 travels in a vertical plane or in the same direction in a plane inclined to the vertical. Under certain conditions it may be desirable to feed the film 49 in a direction transverse to the aforesaid direction, in which case the screws 32 are unscrewed from the bearing ring 29, to permit the bearing member 31 to rotate thereon about its axis. This adjustment of the bearing member 31, which carries with it the objective chamber 30, reels 50 and 51, and associated elements, is continued until the film 49 extends transversely to the position occupied in Fig. 2; when this adjustment has been reached the screws 32 will again register with the threaded recesses of the bearing ring 29 and accordingly may be again screwed into the same to secure the parts in the adjusted positions. The operation and control of the apparatus is the same as described hereinbefore, with the exception that the film 49 now moves in a plane transverse to that in which said film travels in Fig. 2.

The reading apparatus so far described in which the manually controlled adjusting means are hand operated is designed primarily for the projection of reading matter as exemplified, for instance, by a narrative or story in contradistinction to statements or subject matter briefly independent in themselves. In Figs. 14 and 15 of the drawings, the apparatus is shown in the form designed more particularly for reading music and in which the manual adjustment of the film to advance the same is foot controlled. In this form the film 49$^a$ upon which a complete musical composition is produced in minute or reduced size suitable to the dimensions of the customary moving picture film, in travelling from a reel similar to the reel 50 to a reel 51$^a$, which corresponds to the previously mentioned reel 51, passes between two feed rollers 138 and 139 which may be journalled on a bracket 140 depending downwardly from the objective chamber 30, as shown in Fig. 15. The feed roller 139 is connected by a drive chain or belt 141 with the shaft 120$^a$ on which the reel 51$^a$ is mounted so that as the film is advanced by means of the feed rollers 138 and 139 as set forth hereinafter, the reel 51$^a$ will be proportionately rotated to wind the film 49$^a$ thereon. The axis 142 of the feed roller 138 loosely carries an arm or lever 143 provided with a pawl 143$^a$ co-operating with a ratchet on said axis 142 to rotate said feed roller 138 in one direction; a suitable spring 143$^b$ is provided for operating said arm or lever 143 in a return movement during which the pawl 143$^a$ passes over the co-operating ratchet without effecting a rotation of the feed roller 138. The arm or lever 143 is connected by means of a flexible connection 133$^a$, preferably contained in a flexible sheath 133$^b$, with a bell-crank lever 144 pivoted at 145 upon a floor bracket 146, as shown in Fig. 14; the bell-crank lever 144 is pivotally connected at 147 with a foot treadle 148 pivoted at 149 upon said floor bracket 146 as also illustrated in Fig. 14. A spring 150 is provided for automatically maintaining the foot treadle 148 in its normal position and for returning it thereto.

With this arrangement it will be obvious that a depression of the foot treadle 148 will rock the bell-crank lever 144 on its pivot 145 to thereby develop a pull upon the flexible connection 133a which will be transmitted to the arm or lever 143 and will pivotally actuate the same on the axis 142 against the tension of the spring 143b. As the lever or arm 143 is thus operated, the pawl 143a, by acting on the co-operating ratchet, will rotate the feed roller 138 and because of the frictional contact between the feed roller 139 and the film 49a, will correspondingly rotate said feed roller 139; this rotation of the feed rollers 138 and 139 will act on the film 49a to advance the same and to bring a succeeding part of the musical composition on said film 49a into registry with the window 34 for projection on the screen 54 or its equivalent. At the same time the rotation of the feed roller 139 through the medium of the belt or chain 141 will rotate the reel 51a to wind the film 49a thereon as said film is advanced in the manner set forth. If a single depression of the foot treadle 148 is not sufficient to feed the desired length of film, this operation may be repeated until this result has been attained. Each time the pressure of the foot upon the treadle 148 is released, said treadle will be restored to its initial position by the spring 150 and a pull in a reverse direction will be exerted on the flexible connection 133a through the medium of the lever 143 and the spring 143b to restore the parts to normal position; this restoration of the parts, during which the pawl 143a simply rides over its co-operating ratchet, is effected independently of the feed rollers 138 and 139 which accordingly remain stationary at this stage. In all other respects the apparatus shown in Figs. 14 and 15 may correspond to the apparatus previously described and may be mounted and adjusted in the same way and with the same efficiency as set forth with respect thereto. By making it possible to manually control the advancing of the film 49a by foot power, successive portions of the musical composition on said film 49a may be successively projected upon the screen 54 or its equivalent, without requiring the musician to use his hands for this purpose, and may thus be accomplished without interruption in the playing of such composition. While this second form of the apparatus is particularly designed as a reading apparatus for music, it may be utilized with equal efficiency in connection with other types of reading matter and wherever the free use of both hands of the reader is required continuously throughout a given reading operation.

The invention provides a novel method and apparatus for reading subject matter which requires prolonged periods in its perusal and serves to eliminate physical limitations which are incidental to existing methods of reading and to present reading equipment. The novel method and apparatus permits reading without discomfort to the reader in all positions of the latter whether standing, sitting or reclining, and accordingly makes it possible for persons who, for physical or other reasons, are incapable of reading literature and other reading matter in present book or equivalent form, to enjoy the pastime of reading without fatigue or physical discomfort. The novel method and apparatus is efficiently useful in fields of education, instruction, commerce, recreation and entertainment, and permits the reader to adjust the projected reading matter to most efficient reading positions instead of compelling the reader to adapt himself, ofttimes with discomfort, to a book or equivalent publication in which reading matter under existing conditions is most generally provided. In addition to its other advantages, the novel method and apparatus provides, in a simple and efficient manner, all of the requirements for correct visual perception, concentration of light on the text at all times, undisturbed presentation of the reading matter adjusted properly to the eye with regard to comfort and convenience, and avoids the necessity for any material bodily movements on the part of the reader in order to mentally absorb the subject matter being perused. The novel method and apparatus further relieves the reader of the necessity for the supporting of conventional books and other publications which ofttimes are of considerable weight, and makes it unnecessary to turn successive pages of such publications as the reading proceeds, which conditions produce strain and discomfort, particularly during prolonged reading periods. It is further possible with the novel method and apparatus to so focus the reading matter on the screen that the act of reading the same will produce a minimum strain upon the eye of the reader and in many cases will make it possible to avoid the necessity for using reading glasses or equivalent devices now ofttimes found necessary.

The screen, text reproducing mechanism, the light, film, and the entire control means are all included in a single unit, and the novel apparatus is accordingly of such character that per se it may be readily transported about and carried from place to place, while the method of producing such reading matter on the conventional transparent film results in reels of relatively small dimensions and weight and thus enables the reader to carry with him a library of literature, or equivalent subject matter, of considerable proportions without physical hardship. Furthermore the control means and regulating devices are arranged in closely grouped relation upon a bracket plate or its equivalent, which, itself, is adjustably mounted, so as to be capable of being set to a position in which the control means and regulating devices are all within easy reach of the reader. In addition the apparatus makes the reading matter adjustable to the eye-sight instead of requiring the eye-sight to be adjusted to the reading matter as is necessary with the conventional type of publications. This is further facilitated by the adjustability of the screen to the comfort of the eyes. The apparatus permits complete concentration upon the reading matter, and may be advantageously used for reading out of doors; because of the fact that the light is self-contained and hidden, it will not serve to attract insects and the like when the apparatus is used outdoors. The use of the apparatus insures absolute quiet as all noises such as are incidental to the turning of the pages of a book and the like are entirely avoided. The film may include pictures to illustrate the text, which pictures may be closely associated with the pertinent portions of said text and thus be capable of visual examination without requiring any manipulation of the film, as exemplified for instance by reference to different pages in the conventional book.

The apparatus may be combined with various appliances such as ash trays and the like and in all of its forms is ornamental and attractive in appearance; in some cases an electric clock may be combined therewith for flashing the time at will. The apparatus may also be constructed in a form adapted to television and to project broadcast matter upon the screen, and may further be adapted for use in theatres and the like for following the text of a play, opera or similar production. The apparatus, in addition, may have the projection chamber located in other positions than as shown, in which case the projection may be accomplished by means of suitably arranged mirrors. It is obviously difficult to set forth all of the many advantages inherent in the novel method and apparatus, which many advantages are, however, clearly apparent from a mere study and examination of the method and apparatus themselves; the advantages set forth hereinabove are sufficient to clearly indicate the great utility of the novel method and apparatus and the very material advance it represents in the fields of music, art and literature.

Various changes in the specific forms shown and described may be made within the scope of the claims without departing from the spirit of the invention.

I claim:

1. An apparatus for reading comprising a projection chamber having an open forward end, an objective chamber mounted at the rear end of said projection chamber and communicating with the interior thereof, said objective chamber being provided with a window, a screen adjustably mounted in said projection chamber and visible through the forward open end thereof, means for adjusting said screen in said projection chamber, an objective mounted in said objective chamber in registry with the window thereof and directed toward said screen, means for focusing said objective, a transparent film having reading matter produced thereon, a reel carrying said film mounted on said objective chamber, a second reel on said objective chamber adapted to receive said film, means for operating said reels to feed said film across said window, a light chamber pivotally mounted on said objective chamber and adjustable to operative and inoperative positions relatively to said objective chamber, a condenser carried by said light chamber in registry with the window of said objective chamber, an electric light in said light chamber, supporting means for said projection chamber adjustable in a plurality of planes, a handle for adjusting said supporting means to swing said projection chamber in one plane to selectively tilt said screen, means within said handle and said supporting means for adjusting said projection chamber in another plane to correspondingly adjust said screen, a bracket plate in close proximity to said handle, manually operated control means on said plate for operating said screen operating means, additional manually operated control means on said plate for operating said focusing means, and manually operated control means for operating said film reels to feed said film in successive steps across said window to selectively bring successive portions of said reading matter to said screen.

2. An apparatus for reading comprising a projection chamber having an open forward end, an objective chamber mounted at the rear end of said projection chamber and communicating with the interior thereof, said objective chamber being provided with a window, a screen adjustably mounted in said projection chamber and visible through the forward open end thereof, means for adjusting said screen in said projection chamber, an objective mounted in said objective chamber in registry with the window thereof and directed toward said screen, means for focusing said objective, a transparent film having reading matter produced thereon, a reel carrying said film mounted on said objective chamber, a second reel on said objective chamber adapted to receive said film, means for operating said reels to feed said film across said window, a light chamber pivotally mounted on said objective chamber and adjustable to operative and inoperative positions relatively to said objective chamber, a condenser carried by said light chamber in registry with the window of said objective chamber, an electric light in said light chamber, supporting means for said projection chamber adjustable in a plurality of planes, a handle for adjusting said supporting means to swing said projection chamber in one plane to selectively tilt said screen, means within said handle and said supporting means for adjusting said projection chamber in another plane to correspondingly adjust said screen, a bracket plate in close proximity to said handle, manually operated control means on said plate for operating said screen operating means, additional manually operated control means on said plate for operating said focusing means, and a third manually operated control means on said plate for operating said reels to feed said films in successive steps to selectively bring successive portions of said reading matter to said screen.

3. An apparatus for reading comprising a projection chamber having an open forward end, an objective chamber mounted at the rear end of said projection chamber and communicating with the interior thereof, said objective chamber being provided with a window, a screen adjustably mounted in said projection chamber and visible through the forward open end thereof, means for adjusting said screen in said projection chamber, an objective mounted in said objective chamber in registry with the window thereof and directed toward said screen, means for focusing said objective, a transparent film having reading matter produced thereon, a reel carrying said film mounted on said objective chamber, a second reel on said objective chamber adapted to receive said film, means for operating said reels to feed said film across said window, a light chamber pivotally mounted on said objective chamber and adjustable to operative and inoperative positions relatively to said objective chamber, a condenser carried by said light chamber in registry with the window of said objective chamber, an electric light in said light chamber, supporting means for said projection chamber adjustable in a plurality of planes, a handle for adjusting said supporting means to swing said projection chamber in one plane to selectively tilt said screen, means within said handle and said supporting means for adjusting said projection chamber in another plane to correspondingly adjust said screen, a bracket plate in close proximity to said handle, manually operated control means on said plate for operating said screen operating means, additional manually operated control means on said plate for operating said focusing means, and manually controlled foot operated means for feeding said film in successive steps across said window to bring successive portions of said reading matter to said screen, and for simultaneously operating one of said reels to wind up said reel coincidentally with the feeding thereof.

4. An apparatus for reading comprising projecting means including a screen, a reel of transparent film having reading matter produced thereon in minute form, and mounted on said projecting means, a take-up reel on said projecting means for receiving said film from said first reel, means for operating said reels to feed said film through said projecting means, adjusting means located relatively to said projecting means within the range represented by the normal reading distance from said screen for adjusting said projecting means in a plurality of relations to the reader, and control means in close proximity to said adjusting means for controlling the operation of said reels and for adjusting said projecting means to selectively adjust the projected reading matter to readable size at said normal reading distance.

5. An apparatus for reading comprising projecting means including a screen, a reel of transparent film having reading matter produced thereon in minute form, and mounted on said projecting means, a take-up reel on said projecting means for receiving said film from said reel, means for operating said reels to feed said film through said projecting means, means whereby the plane in which the direction of feed of the film is effected may be varied, adjusting means located relatively to said projecting means within the range represented by the normal reading distance from said screen for adjusting said projecting means in a plurality of relations to the reader, and control means in close proximity to said adjusting means for controlling the operation of said reels and for adjusting said projecting means to selectively adjust the projected reading matter to readable dimensions at said normal reading distance.

6. An apparatus for reading comprising a mobile support, projecting means including a screen adjustably mounted on said support, a pair of reels adapted to accommodate a film having reading matter produced thereon in minute form, means for operating said reels to feed said film through said projecting means whereby said reading matter is projected on said screen, and means located within easy reach of a reader for adjusting said projecting means to adjust said screen in accordance with changes in the reading position of said reader without disturbing the reading relation between the latter and said screen and for controlling said reel operating means without requiring material body change in any reading position occupied by the reader at the time.

7. An apparatus for reading comprising projecting means adjustable in a plurality of reading relations to a reader and including a screen, a pair of reels for accommodating a film having reading matter produced thereon in minute form, means for operating said reels to feed said film through said projecting means whereby said reading matter is projected on said screen, and a plurality of means located within easy reach of said reader in a reading position for adjusting said projecting means in accordance with changes in the reading position of the reader and for controlling said reel operating means without disturbing the reading relation between the reader and the screen.

8. An apparatus for reading comprising a mobile support, projecting means including a screen mounted on said support, said projecting means being adjustable to vertically tilt said screen and to set the same in a horizontal plane, a film having reading matter produced thereon in minute form, means for feeding said film through said projecting means whereby said reading matter is projected on said screen, and control means carried by said support within easy reach of a reader in a reading position whereby said screen may be adjusted in accordance with changes in the reading position of said reader and said film feeding means may be operated by said reader without disturbing the reading relation between the latter and said screen.

9. An apparatus for reading comprising a portable support, projecting means including a screen and focusing means carried by said support, a film having reading matter produced thereon in minute form, means for feeding said film through said projecting means whereby said reading matter is projected on said screen, a bracket plate carried by said support and located in front of and at a distance within normal reading range of said screen, and control means mounted on said plate and provided with connecting means extending from said control means to the focusing means and to the film feeding means, said control means being operable by a reader in a reclining or sitting position without material body change in said reclining or sitting position.

MARTIN FEYBUSCH.